United States Patent [19]
Miller

[11] 3,987,441
[45] Oct. 19, 1976

[54] TRACKING GATE SERVOED BY RELATIVE RANGE

[75] Inventor: Jeffrey Ellis Miller, Dallas, Tex.

[73] Assignee: RCA Corporation, New York, N.Y.

[22] Filed: Feb. 26, 1975

[21] Appl. No.: 553,122

[30] Foreign Application Priority Data
Mar. 4, 1974 United Kingdom............... 09646/74

[52] U.S. Cl................................ 343/7.3; 343/5 DP
[51] Int. Cl.² ........................................... G01S 9/56
[58] Field of Search ............ 343/5 DP, 7.3; 324/186

[56] References Cited
UNITED STATES PATENTS

| | | | |
|---|---|---|---|
| 3,075,189 | 1/1963 | Lisicky................................ | 343/7.3 |
| 3,246,324 | 4/1966 | Price.................................... | 343/7.3 |
| 3,376,504 | 4/1968 | Chick .......................... | 343/5 DP X |
| 3,541,448 | 11/1970 | Nutt..................................... | 324/186 |
| 3,618,085 | 11/1971 | Hall ..................................... | 343/7.3 |

Primary Examiner—T.H. Tubbesing
Attorney, Agent, or Firm—Edward J. Norton; Joseph D. Lazar

[57] ABSTRACT

A tracker for an air borne or maritime collision avoidance system includes digital logic to servo a track gate pulse about the target pulse. The logic is arranged to utilize range change data during the interval from the track gate pulse to a moving target pulse. This arrangement eliminates the need for a range counter to measure the entire range from the interrogation pulse to the target pulse. Instead, the range counter measures the range from the leading edge of the track gate pulse to the target pulse and compares the range counter value with a predetermined fixed number representing the range interval from the leading edge of the track gate to the target pulse of a perfectly centered target pulse, or, simply, one half the desired resolution of the system.

4 Claims, 3 Drawing Figures

TRACKING GATE SERVOED BY RELATIVE RANGE

CROSS REFERENCE TO RELATED APPLICATIONS

Of interest are the following copending patent applications: Ser. No. 355,448 entitled "Correlator and Control System for Vehicle Collision Avoidance," filed on Apr. 30, 1973, by R. B. Goyer now U.S. Pat. No. 3,887,916, issued June 3, 1975; Ser. No. 462,491 entitled "Altitude Coding for Collision Avoidance System," filed on Apr. 19, 1974, by J. J. Lyons now U.S. Pat. No. 3,947,845, issued Mar. 30, 1976, both of which applications are assigned to the same assignee as the assignee of the present application.

BACKGROUND OF THE INVENTION

1. Field of the Invention

This invention relates to a digital tracker of vehicles such as aircraft or maritime vessels to provide range data to collision and more particularly to provide a limiter of the movement of the track gate that updates range data substantially linearly.

2. Description of the Prior Art

The present invention is concerned with improvements in the logic used in the trackers of the so-called SECANT systems of air borne collision avoidance systems, such systems, with suitable modification being useful also for maritime vessels. Such trackers provide a means to servo a gate for tracking a target pulse.

In the SECANT tracker, for example, the track gate position is updated by comparing the target range stored in the range counter with the range stored in the range register. A more complete description of such a system is disclosed in U.S. Pat. No. 3,803,604 entitled "Digital Tracker," issued on Apr. 9, 1974, to B. Case. After the comparison is made, the contents of the range register is updated by plus one or minus one or zero counts depending on the outcome of the comparison. This particular feature of the SECANT-type tracker operation is disclosed in U.S. Pat. No. 3,803,605 entitled "Track Gate Movement Limiter," issued on Apr. 9, 1974, to J. E. Miller and B. Case. The present invention provides a simplification of the logic required to achieve such a comparison to achieve the track gate limiting action.

SUMMARY OF THE INVENTION

According to the present invention, a digital tracker is arranged to pre-load a range counter with the range to a target and thereafter to measure the change in the range of the target by tracking the interval from the leading edge of the track gate pulse to the target pulse. The value in the range counter is compared with a predetermined fixed number representing the range interval from the leading edge of the track gate pulse to the centroid of the target pulse. The track gate is moved in accordance with changes manifested by the comparison and is thereby limited by a substantially linear movement.

DETAILED DESCRIPTION OF A PREFERRED EMBODIMENT

Figure 1:
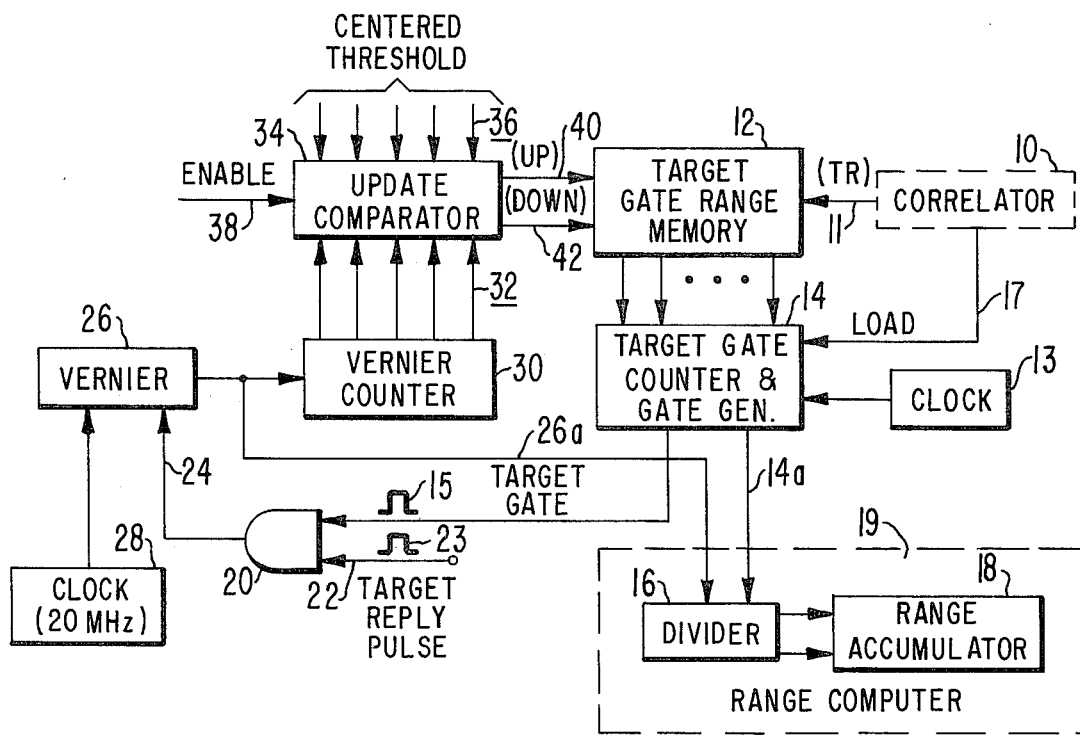
FIG. 1 is a block diagram of the functions of the servoed tracker system according to the present invention.

Referring to FIG. 1, there is shown a block diagram illustrating the arrangement for achieving the functions for a vernier servoed tracker according to the present invention. Input data required for the tracker including range data in the form of clock signals manifesting or representing the range to a target is provided, for example, by a correlator of the type described in the above-identified copending application, Ser. No. 355,448. Such a correlator will provide the initial range to a target to be further tracked as selected or determined by the programmer of the type described in U.S. Pat. No. 3,803,604.

The initial target range determined by the correlator 10 may be provided to the tracker of the present invention in serial or parallel form. In the correlator described in said application, the range data is in serial form as will be illustrated in FIG. 2. Correlator 10 provides the range data over path 11 as the $T_R$ signals and provides a load control to counter 14 over lead 17. The range is loaded into the tracker from the correlator only once at the start of a track period. Thereafter the range is tracked by changing that original range value as will be described. If parallel fed range data is desired, the range data is coupled to the range memory 12 in a suitable manner as will be apparent to those skilled in this art.

The initial target range value provided by the correlator 10 is coupled to a target gate range memory 12. The range data therein is unloaded into a combined target gate down counter and gate generator 14. The gate generator 14 provides a target gate pulse 15 which is of a predetermined duration according to the duration of the desired track gate. A duration of 248 nanoseconds, which is equivalent to a range of 40 yards, is used for maritime vessels for the track gate, while a duration of one microsecond equivalent to 500 feet is used for aircraft. Clock 13 controls the rate of operation of the gate generator 14 which is suitably a 10 MHz clock for aircraft and 4 MHz for seacraft. The clock rate must be fast enough to provide the desired resolution. Thus, 10 MHz is adequate for 50 feet of resolution while 4 MHz is for 40 yards without the use of a vernier.

In addition, gate generator 14 provides a signal over path 14a to a computer 19 comprising a divider 16 for computing a continuous accumulation of range which may be stored in a suitable range accumulator 18 as described, for example, in U.S. Pat. No. 3,803,604 identified above. The signal from counter 30 (to be described) over path 26a is also coupled to the divider 16 to modify the range value as the track gate 15 is moved. Target gate pulse 15, or simply, target gate 15, is applied to AND gate 20 and thus serves as an enabling pulse for passing target reply pulses 23 that are received from the radar or tracker receiver over conductor 22. The target pulse 23 conducted over path 24 to a vernier 26 which is clocked by a high speed clock 28 suitably at a 20 MHz rate.

The vernier gate 26 is suitably of the form as indicated by the range vernier 38 described in the above-identified U.S. Pat. No. 3,803,604.

The expansion of the range resolution may be any value from unity to any desired or required factor using the clock 13, clock 28, and the vernier 26 to achieve the desired expansion. For example, for an aircraft tracker, the range value of 50 feet for each 1 tenth of a microsecond pulse for a 10 MHz clock 13 can be expanded by vernier 26 to 5 feet. Similarly, for seacraft of slower movements, a faster clock 13 at 20 MHz will provide 8-yard resolution which can be expanded by vernier 26 to one yard for each clock pulse.

Target reply pulses 23 are provided from a receiver including either a leading edge or centroid detector. In the embodiment to be described in FIG. 2, a leading edge detector is used to provide the target reply pulses 23 to be processed by the tracker of the present invention.

The vernier gated output signals from the vernier gate generator 26 clocked by clock 28 at the range of 20 MHz are coupled to a vernier counter 30. Vernier counter 30 provides output signals indicating changes of range over conductors 32 to a comparator 34. Update comparator 34 receives a centered vernier count threshold signal over conductors 36 from suitable hardwired logic (not shown) representing a predetermined value in clock pulses equivalent to one half a track gate pulse. A suitable enable pulse is coupled to the comparator over conductor 38 related to a selected time delay but only after receiving a target reply. The preset threshold depends on the chosen resolution of the system. The threshold value is equivalent to the number of clock pulses equal to the midway point in the track gate using the vernier resolution as the increment. Thus, for example, for seacraft having a bin value from the correlator of 40 yards for one 4 MHz clock pulse, and the vernier provide an expansion of 40, 20 clock pulses will provide one half the width of the 40 yard track gate. If the target reply pulse 23 is not midway in the track gate 15, the comparator will generate an up or down signal to memory 11 to change the initial range. If the number in comparator 34 is smaller than the threshold 36, the range is reduced. The range gate is thus moved accordingly by decrementing memory 12 and thereby gate counter 14. Thus, the comparator provides an output to increase the memory 12 over conductor 40 or to decrease the memory 12 over conductor 42.

OPERATION OF THE SYSTEM OF FIG. 1

In operation, the range from the leading edge of the target gate to the target is determined by correlator 10 in response to the target request signals of the radar system as described in U.S. Pat. Nos. 3,803,605 and 3,803,604, cited above.

The range is stored in memory 12 and then loaded into gate counter 14 in response to the load signal via path 17. Clock 13 gates the gate generator 14 to provide target gate 15. The presence of target reply pulse 23 is passed through gate 20 and applied to vernier 26 which responds to the common (ANDed) portions of the two signals 15 and 23. Vernier counter 30 quantizes this value and applies that value to comparator 34. A comparison to the threshold value 36 determines whether memory 12 is to be incremented or decremented over paths 40 or 42. If there is no target pulse 23, there is no change in memory 12 and the target gate 15 will remain in accordance with the last range. Subsequent reply pulses 23 will alter memory 12 if the range has not changed beyond the limit of the target gate 15. If so, the tracker will track a new target.

If it is desired, an analogue-to-digital (A/D) converter may be used in place of the vernier counter 30. For such an arrangement, there is no need to utilize a high speed clock 28 since the A/D converter operates directly in response to the output of the vernier 26 to provide an analogue signal to be coupled to comparator 34.

PREFERRED EMBODIMENT (FIG. 2)

Figure 2:
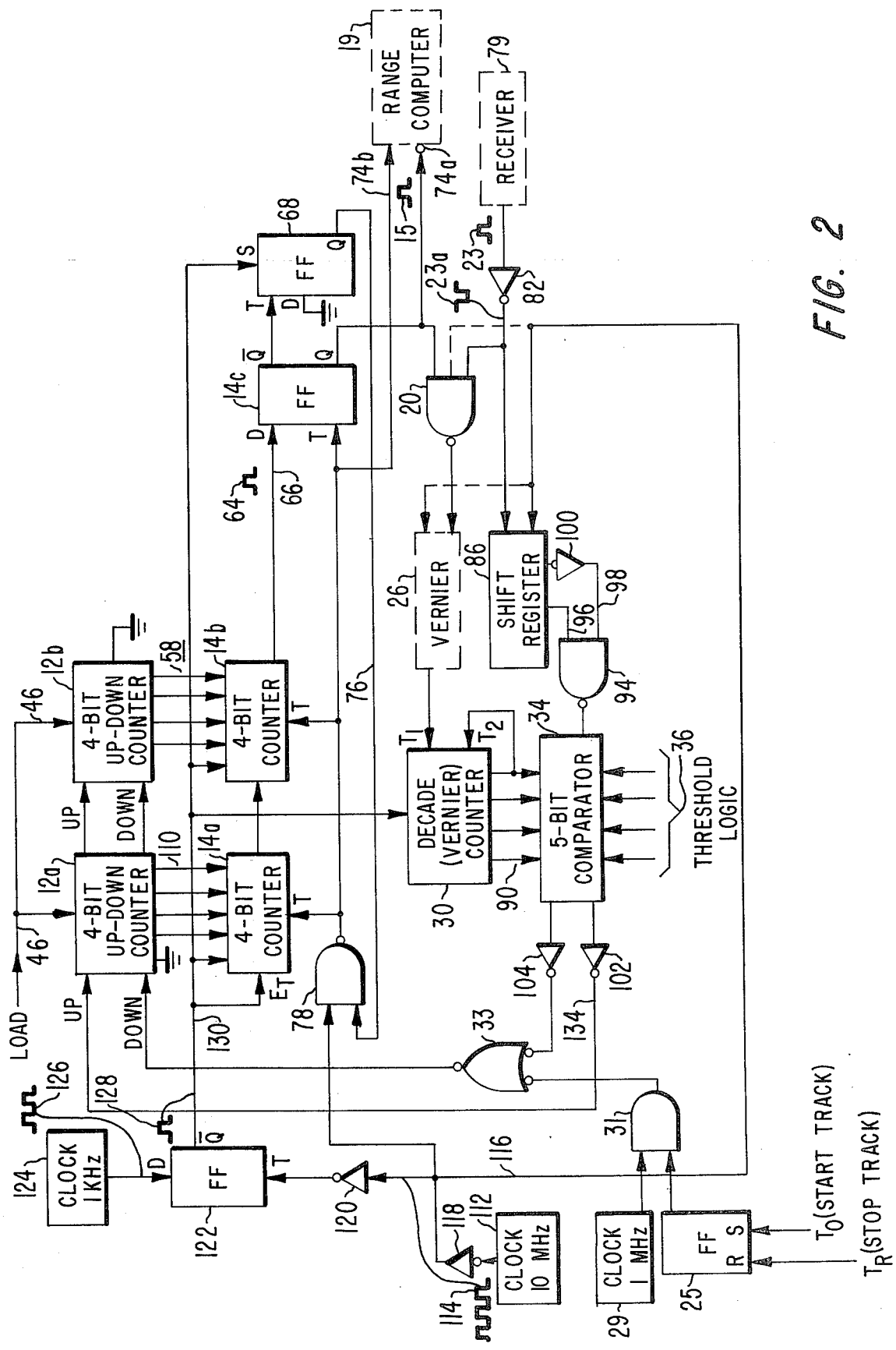
FIG. 2 is a block diagram of a preferred embodiment of the tracker according to the present invention.

Referring now to FIG. 2, there is shown a detailed block diagram of the preferred embodiment implementing the vernier servoed tracker functionally described in FIG. 1.

The functional blocks illustrated in FIG. 1 as implemented in FIG. 2 are identified in FIG. 2 with the same reference numerals for easy association. Further, the circuit of FIG. 2 is arranged to operate substantially independently of external circuits insofar as illustrating the operating principle of the track gate limiting action of the present invention.

Counters 12a and 12b, serving as the target gate range memory 12 of FIG. 1, is suitably implemented as two 4-bit up/down counters. The initial range is applied to these counters by suitable switches, not shown, or by being coupled to the correlator described in the above-identified application, Ser. No. 355,448. Thus, the interrogation signal ($T_o$) generated by the correlator is applied to the set terminal of FF 25 and the target reply signal ($T_R$) is coupled to the reset terminal. Flip-flop 25 is set and rest by the interrogation and reply signals to trigger an output signal to AND gate 31 receiving clock signals from a 1 MHz clock 29. The ANDed output is coupled through NOR gate 33 to the down input of counter 12a. The interval determined by the two pulses is the initial range that is loaded into the track gate limiter. A suitable control signal, such as described in U.S. Pat. No. 3,803,603, inhibits further loading of the range into the counter 12a until a new target is to be tracked.

The range value in counters 12a and 12b is transferred into up counter 14a and 14b via leads 110 and 58 in response to a 1 kHz clock load signal from clock 124 through FF 122 over output $\overline{Q}$. Counters 14a and 14b serve as the counter portion of the target gate counter 14 of FIG. 1. Clock 124 provides a signal 126, corresponding to interrogation signals of the SECANT system, once every millisecond. This signal is passed through FF 122 as signal 128 in response to gated signals from the 10 MHz clock 112 to provide the load signals for counters 14a and 14b.

The carry-out output pulse 64 from counter 14b is coupled to the D input of flip-flop 14c over lead 66. The complementary output ($\overline{Q}$) is coupled as the T input of flip-flop 68 while the Q output of FF 14c (track gate 15) is coupled to one input of NAND gate 20. The Q output is the track gate pulse 15 which may be coupled to the range computer 19 of the tracker via terminal 74a. The D input of flip-flop 68 is grounded and the Q output is coupled over lead 76 to a NAND gate 78. The target pulse 23 derived by the receiver 79 is coupled through an inverter 82, the output of which is a pulse 23a which is coupled to a second input of NAND gate 20 and to the input of a shift register 86. The output of the NAND gate 20 is coupled to the $T_1$ input of the decade counter 30, serving as the vernier counter, the output of which is coupled through four leads 90 to a 5-bit comparator 34, serving as the update comparator. The option of using a vernier 26, shown in dotted lines will be described below. The $T_2$ input lead to the counter 30 is coupled to one of the output leads.

To provide a suitable pulse width two suitable output signals of shift register 86, e.g., from the tenth and fifth stages are coupled to a two input NAND gate 94 respectively over leads 96 and 98, the latter of which being coupled through an inverter 100 in order to convert the polarity of the output pulse from shift register 86. The output of NAND gate 94 provides the enabling input of 5-bit comparator 34. The comparator provides a positive and negative output of the comparison of the counter 30 to the threshold 36. The positive (up) or negative (down) output is coupled through inverter 102 or inverter 104 and NOR gate 33 respectively to the up/down inputs of 4-bit up/down counter 12a. The up/down carry out outputs of counter 12a are coupled to the 4-bit up/down counter 12b. The contents of counters 12a and 12b are coupled to 4-bit counter 14a and 14b over leads 110 and 58.

A 10 MHz clock 112 provides a 10 MHz clocking pulses 114 over bus 116 through inverter 118 to gate 78, to register 86 and through inverter 120 to the T input of flip-flop 122. The D input of flip-flop 122 is gated by clock 124 providing a 1 kHz clocking pulse 126 serving to simulate the interrogation signal. The complementary output pulse 128 is coupled over bus 130 respectively to the counters 14a and 14b, and as the S input to flip-flop 68. The circuit as described provides a track gate movement limiter servoed by a "unity" vernier having, in effect, an expansion of unity. In order to utilize a vernier, the circuit as shown in dotted lines may be provided. Thus, a vernier 26 is interposed in the path between gate 20 and counter 30. A suitable clock signal is coupled to the clock input of vernier 26 and a third input to gate 20 from the bus 116 carrying clock signals 114.

OPERATION OF THE EMBODIMENT OF FIG. 2

Figure 3:
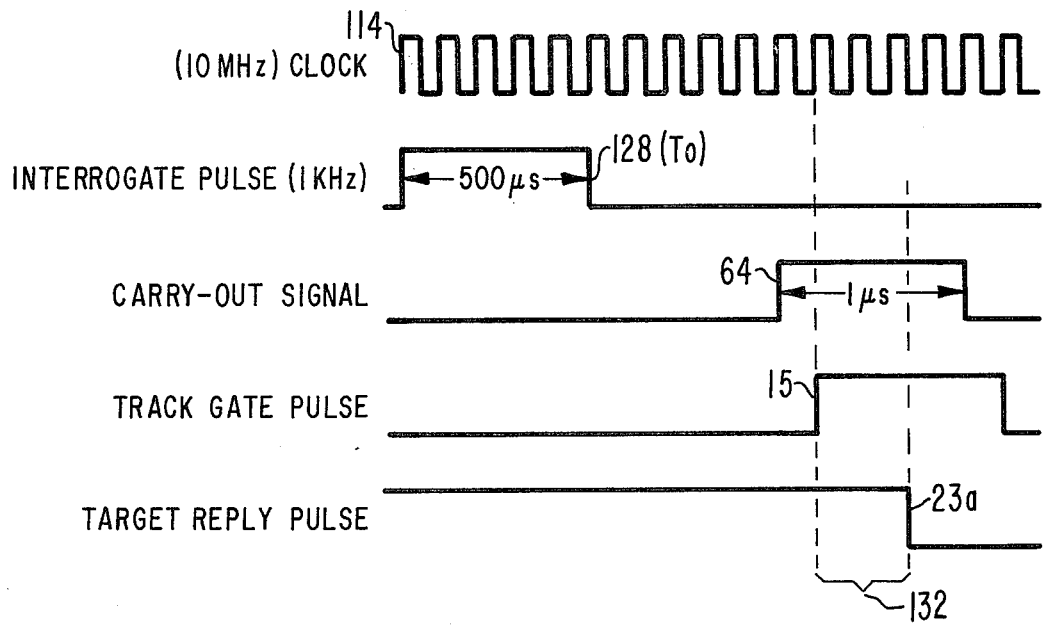
FIG. 3 is a timing chart illustrated by several pulse signals used or generated by the tracker as shown in FIG. 2.

The operation of the tracker embodied in FIG. 2 will now be described in conjunction with the timing chart of certain signals illustrated in FIG. 3.

The circuit of FIG. 2 generates a track gate (pulse 15) that is servoed to be centered about the leading edge of the target pulse 23 derived from the radar receiver 79. The initial and thus present target range is preset into the circuit via FF 25 which is started by an interrogation signal $T_o$ and stopped by the target reply signal $T_R$. During this period, the range in clock pulses is gated through gate 31 and to counters 12a and 12b via NOR gate 33. Alternatively, these range signals are suitably provided by a correlator described above.

After the range has been preset, represented by a "negative" (down counted) number in the counters 12a and 12b, their respective contents are loaded into counters 14a and 14b in response to each pulse 128 occurring once per millisecond. The clock 124 providing the 1 kHz interrogation signal 128 is asynchronous but compatible with the SECANT type system. The signals 128 may preferably be provided by the SECANT correlator described above in copending application, Ser. No. 355,448. Counters 14a and 14b are counted up to zero under control of clock pulses 114 gated through gate 78 which in turn is enabled by the Q output from flip-flop 68. The carry out pulse 64 of counter 14b is one microsecond wide since the counter is a BCD counter and the clock rate of pulses 114 is 10 MHz. The carry out pulse 64 is staticized or resynchronized or held by flip-flop 14c. The Q output pulse 15 from flip-flop 14c is the track gate. The Q output of FF 68 turns off the clock 112 triggering counters 14a and 14b by disabling gate 78 when signal 64 ends.

The Q output of flip-flop 14c enables NAND gate 20 in the presence of target reply 23a and thus clocks a range by clock signal 114 into the decade counter 30. Counter 30 functions as a vernier simulator since it accumulates a count corresponding to the time interval, which is the relative range, between the track gate pulse 15 and the target pulse 23a. This is shown in FIG. 3 as the interval 132.

In practice, a vernier circuit arrangement may be used to quantize this time interval (132) in finer resolution then a 10 MHz clock such as clock 112 is capable of doing. Thus, a vernier 26 may be provided as described above. Also, an analogue-to-digital converter could be used in place of the vernier counter 30 as described above with respect to FIG. 1.

If the leading edge of track gate pulse 15 is centered about the leading edge of the target pulse 23a, counter 30 will count up to five, and furthermore no output will appear at the digital comparator 34 when it is strobed by the delayed signal passed through NAND gate 94. If the count in counter 30 is less than 5, an up pulse will appear in comparator 34 that will then update the counters 12a and 12b in the proper up direction over lead 134.

Similarly, a count of greater than 5 in the counter 30 will up date counters 12a and 12b by the down control from comparator 34 via inverter 104 and gate 33. The update pulse is the comparator strobe pulse from gate 94 generated by delaying the target pulse 23a through shift register 86. Thus, if there is no target pulse 23 and thus no inverted target pulse 23a, there is no update and the track gate 15 will remain fixed.

It will now be appreciated that according to the present invention by the use of a single target range input, only the interval of the track gate pulse 15 to a moving target pulse 23a need be measured thereafter. Thus, the need for a large full range counter to measure the entire range from the signal 128 to the target pulse 23a for each ranging calculation during a target track is not needed. Instead, a range counter need only measure the range from the leading edge of the track gate pulse (15) to the target pulse (23).

What is claimed is:

1. A limiter for track gate movement of a track gate for a digital radar tracker wherein reply signals from a remote station are generated in response to interrogation signals having a predetermined repetition rate, said tracker including means for determining only at the start of a track period in response to said interrogation signals the range of said remote station, and storing data representing said range in a memory, comprising in combination:
    a track gate for receiving said reply signals, said track gate being rendered operative by a tracking gate pulse,
    means for detecting the leading edge of said reply signals,
    means for transferring the range data of said memory to a counter and means responsive to the range data transferred to said counter for generating said tracking gate pulse,
    said tracking gate pulse having a leading edge and a predetermined width corresponding to the resolution of the radar tracker,
    comparator means for deriving a count signal manifesting the difference between a count representing the interval of time between the leading edge of said tracking gate pulse and the leading edge of said reply signal and a predetermined count representing one half the duration of said tracking gate pulse, and means responsive to said count signal for altering the range in said memory in accordance with the difference of the interval of time between said tracking gate pulse and said reply signal.

2. A limiter according to claim 1 further including a vernier responsive to the output of said track gate for increasing the resolution of said comparator.

3. A limiter according to claim 2 wherein said vernier is an anlogue vernier.

4. A limiter according to claim 2 wherein said vernier is a digital vernier.

* * * * *